Nov. 14, 1944.  A. R. THOMPSON ET AL  2,362,733
APPARATUS FOR TREATING MILK
Original Filed March 18, 1940    4 Sheets-Sheet 1
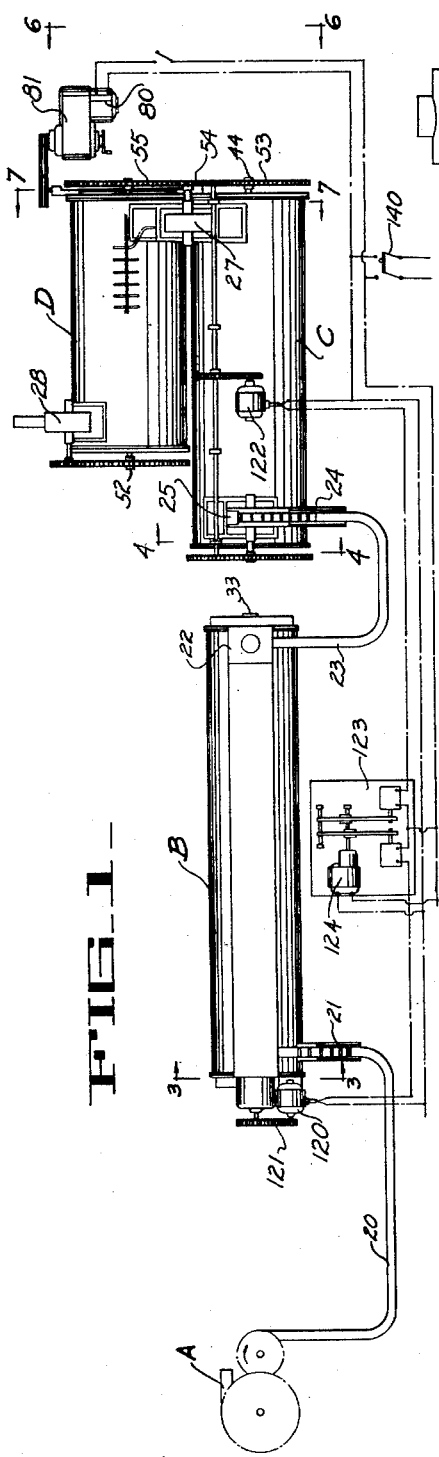
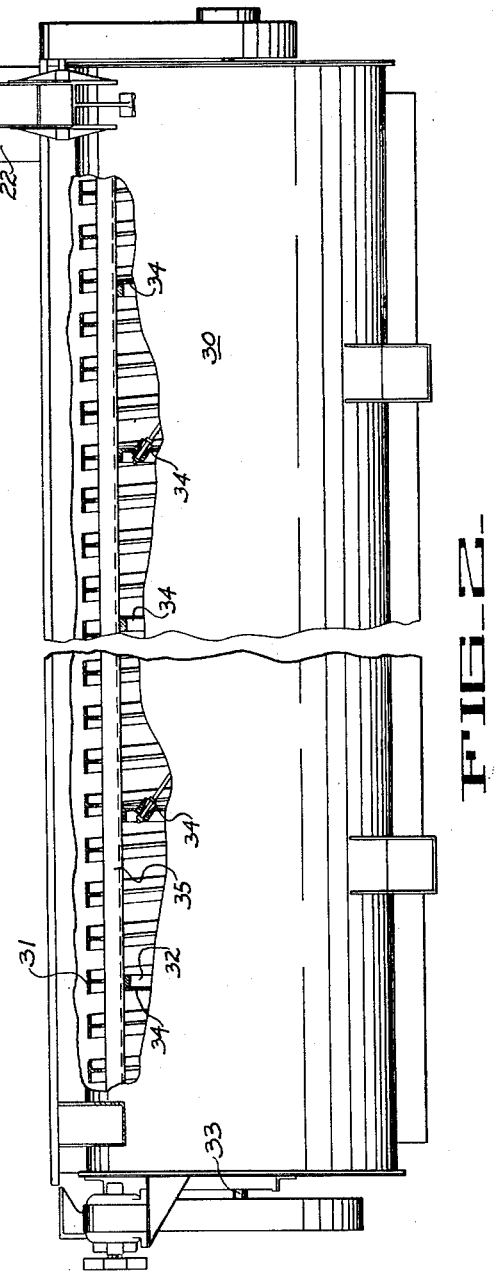
INVENTOR.
ALBERT R. THOMPSON
JOSEPH BUCHER
BY
ATTORNEY

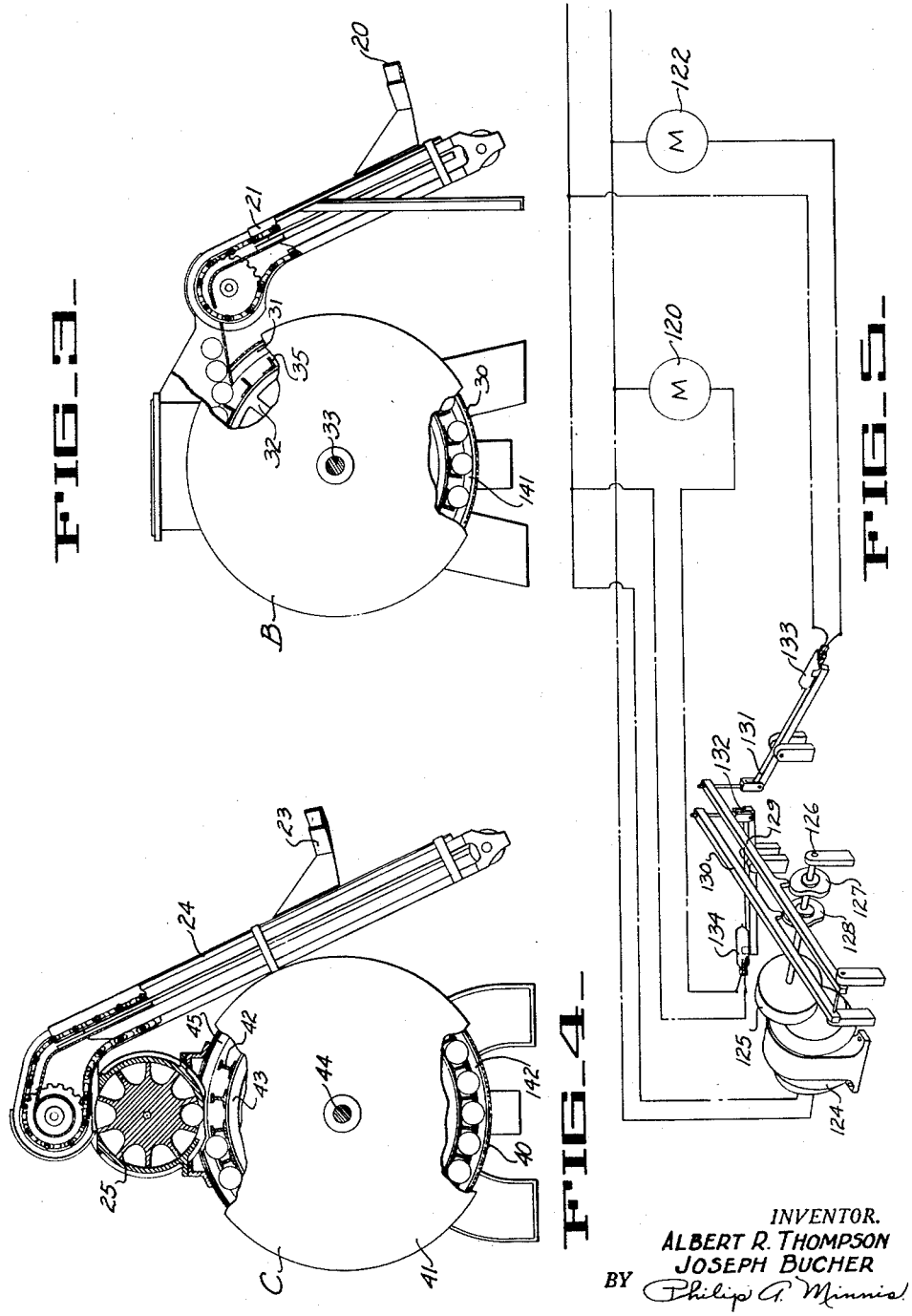

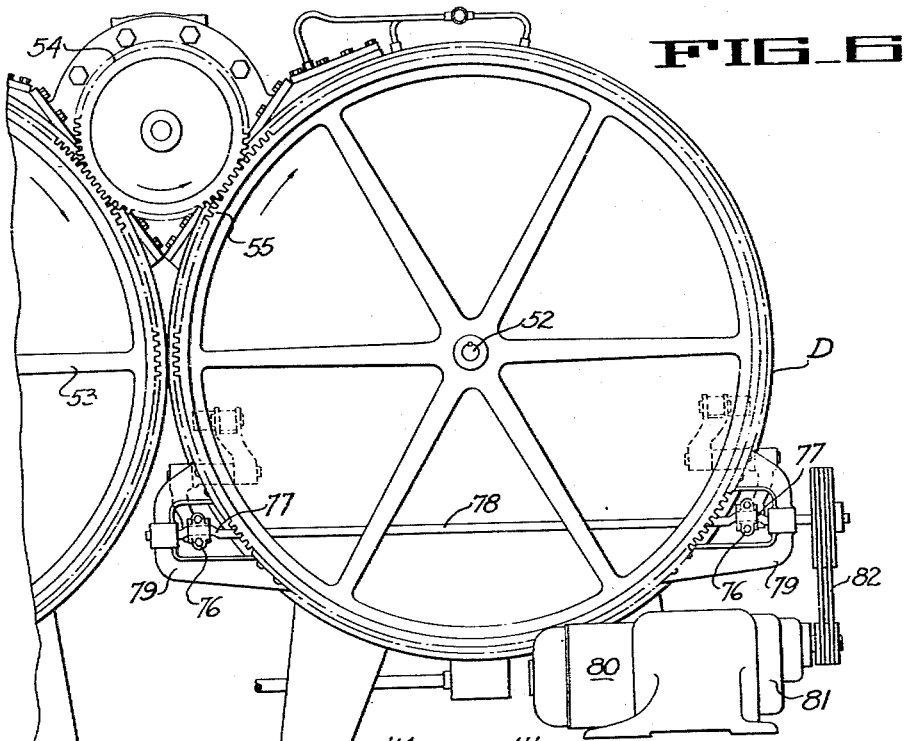
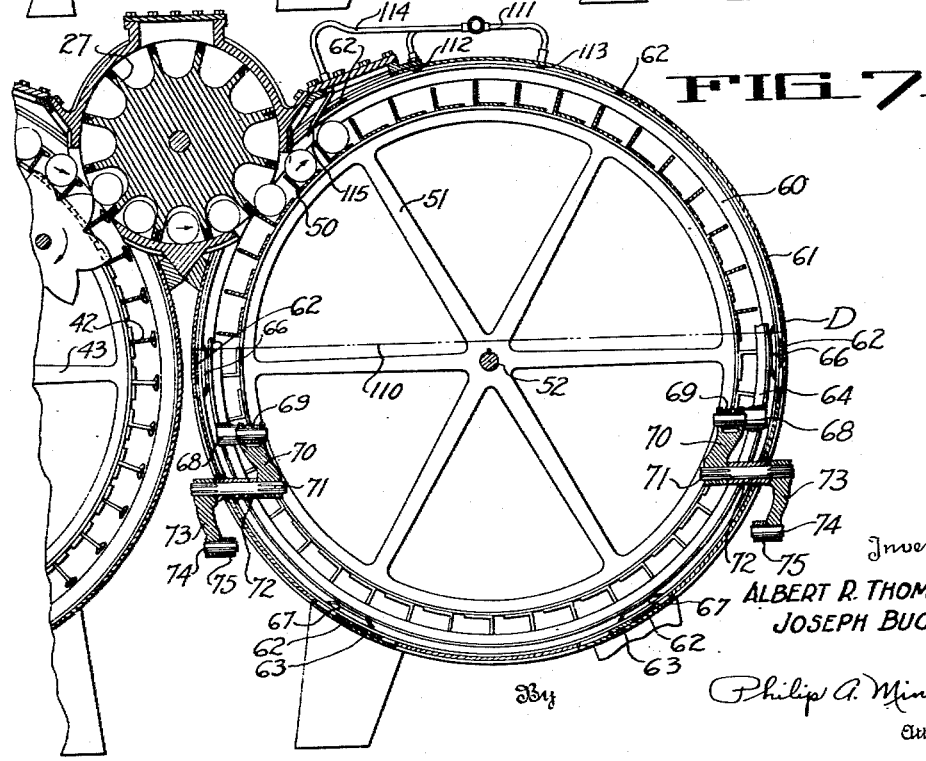

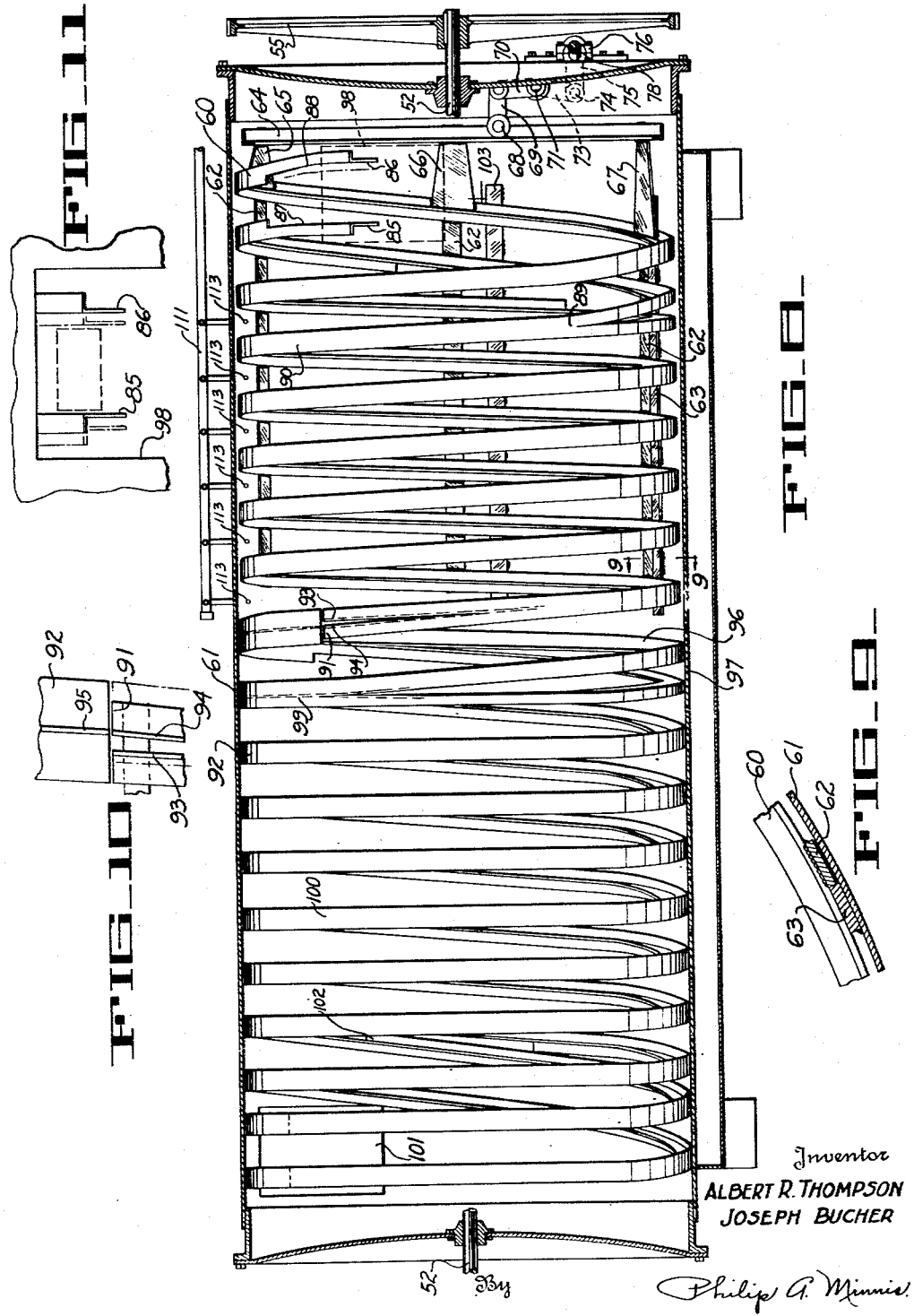

Patented Nov. 14, 1944

2,362,733

UNITED STATES PATENT OFFICE 2,362,733

APPARATUS FOR TREATING MILK

Albert R. Thompson, Los Gatos, and Joseph Bucher, Modesto, Calif., assignors to Food Machinery Corporation, San Jose, Calif., a corporation of Delaware Original application March 18, 1940, Serial No. 324,452. Divided and this application April 1, 1941, Serial No. 386,258

9 Claims. (Cl. 99—359)

This invention relates to the canning art and more particularly to the sterilization of canned evaporated milk.

The principal object of our invention is to provide an apparatus for carrying out the improved process for treating canned evaporated milk disclosed in our co-pending application Serial No. 324,452 filed March 18, 1940, of which the present application is a division.

In order to sterilize evaporated milk it is necessary to destroy all the spoilage micro-organisms, and this is achieved by heating the milk and holding it at the sterilizing temperature for a proper length of time. One of the desirable results we obtain by the use of our apparatus, in addition to the sterilization of the milk, is an increase in the viscosity. This is achieved by timed agitation of the milk during the period of sterilization. The can is brought to absolute rest for a time and then it is agitated, the periods of rest and agitation alternating at regular timed intervals. We have found that while the actual lengths of the rest and agitation periods are susceptible to variation, the best results are obtained by accurate control and regulated intervals.

The increased viscosity obtained in the milk is desirable for two reasons: first, the viscosity of canned milk decreases during storage and transport, and second, the greater the viscosity the less the tendency toward fat separation.

The fat, being of different specific gravity from the remainder of the milk, tends to rise to the surface. Any considerable separation of fat causes a layer of cream to form on top of the milk which will not re-emulsify and when agitated as in transportation churns into lumps. Ordinarily it is not safe to increase the viscosity of canned milk beyond a certain point, because of the formation of permanent curd. However, by means of the apparatus which we are about to disclose the viscosity can be successfully raised to a degree of commercially accepted significance without impairing the marketability of the product in any way.

In the drawings:

Fig. 1 is a diagrammatic showing in plan view of the entire apparatus as it is usually laid out in an evaporated milk plant.

Fig. 2 is a side elevation of the preheater with parts of the shell broken away to disclose the interior.

Fig. 3 is an end view of the preheater taken as indicated by the arrows 3—3 in Fig. 1 with parts broken away.

Fig. 4 is an end view of the sterilizer taken as indicated by the arrows 4—4, in Fig. 1, with parts broken away.

Fig. 5 is a diagrammatic showing in perspective of the timing mechanism.

Fig. 6 is an end view of the cooler taken as indicated by the arrows 6—6 in Fig. 1.

Fig. 7 is a section of the cooler taken as indicated by the arrows 7—7 in Fig. 1.

Fig. 8 is a sectional view of the cooler with the canway construction shown in elevation and the reel omitted for clarity.

Fig. 9 is a fragmentary sectional view taken as indicated by the arows 9—9 in Fig. 8.

Fig. 10 is a fragmentary showing of a portion of the canway taken from the interior thereof.

Fig. 11 is a fragmentary showing of the feed end of the agitating canway, as it would appear from the exterior of the shell with the transfer valve removed.

Referring to Fig. 1, reference character A indicates a can filling and soldering machine, B a preheater, C a sterilizer, and D a cooler; the arrangement being such that the cans pass from one to the other in the order named.

The can filling and soldering machine A is of the continuous automatic type adapted to receive a continuous file or procession of cans, and to fill them with milk through small openings provided in the head of each can, and then to apply solder over the openings to hermetically seal the cans. Machines of this type are well known in the art and form no part of the present invention.

The filled and sealed cans discharged from the machine A are received by an inclined gravity chute 20, which functions as an accumulator, as will be presently described.

The chute 20 delivers the cans to an elevator 21 which feeds the cans into the preheater B. The cans are automatically discharged from the preheater B through a discharge valve 22, which deposits the cans in a gravity transfer chute 23, which delivers the cans to an elevator 24 that deposits them in a steam tight rotary pocketed valve 25 which introduces the cans into the sterilizer C. The cans are automatically transferred from the sterilizer by the transfer valve 27, which introduces them into the cooler D, from which they are finally discharged through the valve 28.

Having disclosed generally the procedure of the cans through the apparatus, the construction of the various units will now be explained.

Referring to Figs. 2 and 3, the preheater B may be of the conventional reel and spiral type, and preferably is of the general construction illustrated and described in U. S. Letters Patent to A. R. Thompson, No. 2,092,434.

The preheater is made up of a cylindrical shell 30, the ends of which are closed by heads so as to form an enclosed heating chamber therewithin. A helically trending guide rail 31, secured to the inner surface of the shell extends from the inlet of the pre-heater to the outlet, forming a canway along which the cans are advanced through the machine. The cans are advanced along the canway in a continuous procession by means of a rotating reel 32, mounted on shaft 33, journalled in suitable bearings in the end heads of the preheater shell, and may be formed of a plurality of discs 34 secured to the shaft 33 and carrying a series of longitudinally extending angle iron rails 35 on their peripheries.

It will be apparent that in operation, as the cans are discharged from the elevator 21, they will be introduced one after another into the successive pockets between the pusher rails 35 of the reel 32, and will be carried around the inner surface of the preheater along the helically trending canway 31, and will thus be conveyed through the preheater B.

Heat may be supplied to the interior of the preheater by means of a series of steam pipes, not shown, projecting different distances into the heating chamber from one end thereof, as disclosed in the above-identified patent. By this arrangement, a graduated temperature may be obtained in the preheater, ranging from approximately 100° F. at the inlet end, to approximately 210° F. prior to and up to the discharge end, so that as the cans are advanced through the machine, they are gradually heated up to the temperature of 210° F. and held at that temperature for a period of time before being discharged.

Referring to Fig. 4, the sterilizer C comprises a cylindrical shell 40, closed at the ends by heads such as 41, to form an enclosed chamber into which steam may be introduced for supplying the heat of sterilization. Any suitable means, not shown, may be provided for heating the interior of the sterilizer to maintain the proper sterilizing temperature, ordinarily from 240° F. to 245° F.

The cans, it will be recalled, are transferred from the preheater by the chute 23 and elevated by the elevator 24 to the valve 25, which introduces the cans one by one, into the pockets between the longitudinal rails 42 of the reel 43, which is mounted on the shaft 44. A spirally trending canway 45 is secured to the interior of the shell 40 to advance the cans along the rails 42 from the inlet valve 25 to the transfer valve 27 (Fig. 7).

The transfer valve 27 may be of the construction illustrated in U. S. Letters Patent to A. R. Thompson, No. 1,467,960. The cans are transferred as indicated by the arrows in Fig. 7, and are deposited in pockets formed between longitudinally extending rails 50 carried by reel 51 mounted on shaft 52.

The sterilizer reel 43 and the cooler reel 51 are rotated in the same clockwise direction. The sterilizer reel shaft has a gear 53 (Fig. 6) meshing with gear 54 which operates the valve 27. The gear 54 also meshes with the gear 55 for driving the cooler reel shaft 52 in synchronism. A canway 60 (Fig. 7) is provided in the cooler to advance the cans along the rails 50. This canway is not, however, rigidly secured to the shell 61 of the cooler D, but is mounted for reciprocation axially of the cylindrical shell in order to impart agitation to the cans when they enter the cooler, as will be more apparent later in the description.

The construction of the agitating canway 60 is shown in Fig. 8. It comprises several spiral turns which are secured together as a rigid unit by means of straps 62. The bottom straps 62, on each side of the center, have sliding bearings on straps 63 (Figs. 8 and 9) which are welded to the shell 61, so that the straps 63 constitute the sliding bearing supports for the agitating spiral unit 60. In addition, two spacer strips 103 are secured to the shell and contact the back of the canway to aid in guiding it. The means for reciprocating this unit will now be described.

A ring 64 (Figs. 7 and 8) is rigidly connected to the unit 60 by means of plates 65, 66, 67. The ring 64 has two pins 68 mounted thereon which are connected by links 69, to levers 70 splined on shafts 71. The shafts 71 extend laterally outside the tank through bearings 72 mounted on the shell 61. The outer ends of the shafts 71 have levers 73 splined thereon. The depending ends of the levers 73 are connected by means of pivot pins 74 with links 75. The opposite ends of the links 75 are pivotally attached by means of bearings 76 (Figs. 6 and 8), with cranks 77 formed in the transversely extending shaft 78 which is supported for rotation in bearing brackets 79 mounted on the exterior of the shell. The shaft 78 is rotated by means of a motor 80, variable speed drive 81 and belt drive 82. It will be apparent that by this means, the crank shaft 78 is constantly rotated, causing oscillation of the levers 70, 73 and reciprocation of the ring 64, which in turn causes reciprocation of the agitating spiral canway 60. While we have referred to this as constant agitation, in practice we prefer to have the motor 80 of a type whose speed can be varied somewhat and also connected to the line through an individual switch, so that the agitation can be used or not, as conditions demand. Under most conditions, however, we find that the agitation is necessary and advantageous. When the motor is turned on and the speed set, the agitation continues constantly. We have obtained good results with a speed of reciprocation of 85 to 125 strokes per minute. Excessive agitation, however, is to be guarded against since it will tend to break down the body of the milk and reduce its viscosity.

In order to facilitate introduction of the cans into the reciprocating canway, the inlet end of the canway is formed by means of two spiral sections 85, 86. In Fig. 11, the ends of the spiral move from the full line position to the dotted line position, and then back to the full line position, in each complete reciprocation. The can is introduced in the position shown in broken lines, and due to the spacing of the ends 85, 86, neither obstructs admission of the can at any time.

The inner sides of the flanges of the canway portions 85, 86, are cut away at 87, 88 (Fig. 8) in order to admit the can into the canway. The can travels around between these two portions of the spiral, which lead the can away from the inlet opening 98. From the point 89, a single canway 90 is employed. Both sides of the rib of the T can be used in this portion because the angle of lead is constant. The canway 90 leads the can to the end 91 of the agitating portion 60. At this point, the can is to be transferred to a stationary canway 92, which is rigidly mounted within the shell 61. In order to insure transfer of the can from the reciprocating canway 60 to the stationary canway 92, the end 91 of the reciprocating canway is forked to provide two guiding flanges 93, 94 (Fig. 10), which are alternately in line with the flange 95 of the stationary canway 92.

In the first turn of the stationary canway, the angle of lead is again changed to obtain sufficient clearance to permit the reciprocation of the last turn of the agitating canway. This necessitates the split or double track comprising the angle sections 96 and 97. The rib of the section 96 guides the left end of the can in the transfer zone and the section 97 guides the right hand end after the can is completely in the stationary canway. The two sections 96, 97 converge at 99 in the T-section and, since the lead remains constant, the single track 100 of T-section can be employed until the can approaches the discharge outlet 101. At the point 102 the double track construction is again employed to change the lead in order to shift the can over into line with the discharge outlet 101.

Water is employed as the cooling medium in the cooler D, but since the water level in the cooler is maintained at the point indicated by the line 110 (Fig. 7), additional means are provided in conjunction with the agitating canway 60 to apply cooling medium to the cans in the upper portion of the spiral. This is effected by means of a system of pipes indicated generally at 111, which supply cooling water to spray nozzles 112, 113, which distribute the water over the tops of the cans located on the upper side of the reel 51. It will be noted in Fig. 8 that there are a series of these nozzles located between the turns of the agitating spiral 60. A separate pipe line 114 has an outlet 115 for supplying cooling medium to the cans as they issue from the transfer valve 27.

The operation of the apparatus is as follows: The preheater B is driven by a motor 120 (Fig. 1) connected by gearing 121 to the shaft of the preheater reel. Similarly a motor 122 is provided for driving the reel of the sterilizer C, and through the gearing 53, 54, 55, the reel of the cooler D. These motors 120, 122 are operated intermittently in timed relation by means of a timing mechanism shown diagrammatically at 123.

As better illustrated in Fig. 5, the timing mechanism 123 comprises a constantly running motor 124, which through a reducing gear 125 rotates the shaft 126, on which two cams 127, 128 are mounted. The two cams are substantially identical in contour, but are angularly displaced with respect to each other on the shaft 126. Cam followers 129, 130, through suitable linkage 131, 132 rock mercoid switches 133, 134, which control the operation of motors 120, 122. The cams 127, 128 being similar, serve to cause the motors 120, 122 to operate for a definite length of time and then by rocking the mercoid switches 133, 134, stop the motors for a definite length of time. When the followers 129, 130 are again lifted out of the dwells in the cams 127, 128, the mercoid switches 133, 134 are again closed.

The motor 124 is preferably a synchronous motor, and as a result, the reel motors are caused to start and stop at definite time intervals. The cams 127, 128 are angularly disposed with respect to each other, to give motor 122 a lag in time of operation with respect to the motor 120. The amount of this lag is determined by the length of the transfer chute 23, Fig. 1, the purpose being to insure that all of the cans are taken out of the chute 23 after the preheater B is stopped and before the sterilizer C is stopped. At the end of the rest period, the timing mechanism 123 starts the motor 120 to begin the operation of the reel in the preheater B, before the motor 122 is started. Again the angular displacement of the cams 127, 128 causes the sterilizer motor 122 to start the reel of the sterilizer after the preheater has started or as soon as the transfer chute 23 is filled.

The chute 20 which supplies the cans to the preheater from the filling machine is made long enough to store as many cans as the filling machine A, which operates constantly, will deliver during the time that the preheater is at rest. For example, if the preheater B has a rest period of one minute, and the filling machine A is operated at the rate of 200 cans per minute, then the accumulator 20 should be long enough to contain 200 cans. The speed of operation of the preheater, sterilizer and cooler is such that in their intermittent operation, they average the same number of cans per minute as the filling machine, so that, for example, if the preheater has an operating period of three minutes, it is operated at a sufficient speed to absorb the cans contained in the accumulator 20, and in addition, three minutes output of the filling machine A.

The motor 80 (Fig. 1) which drives the mechanism for reciprocating the agitating portion of the cooler canway is constantly running in the sense previously explained, and as shown in the wiring diagram, is connected to the line through the main switch 140.

Having described the timing of the apparatus, the operation of the progression of the cans through the machine will now be briefly described.

The cans are filled with milk by the filling machine A, and are discharged into the chute 20. If the preheater B is operating, the elevator 21 immediately conveys the cans into the preheater. If the reel of the preheater is at rest, the cans accumulate in the chute 20. The cans are deposited in the pockets between the rails 35 (Fig. 3) in the preheater, which are preferably of angle formation to permit the cans to contact the canway 31 during their travel along the bottom at 141, where rotation of the can about its axis occurs, in addition to the turning of the can with the reel.

By the time the can has arrived at the discharge 22 of the preheater B (Fig. 1), the milk has been raised to a temperature of approximately 210° and held at that temperature for a period of time so that it has been sufficiently stabilized to undergo the high heat of sterilization. The cans are then deposited in the chute 23, from which they are carried into the sterilizer by the elevator 24.

The valve 25 introduces the can into the pockets between the rails 42 (Fig. 4), which are I-shaped in section to maintain the can out of contact with the canway 45 at all times, including the traverse of the can over the bottom of the tank, as shown at 142. This limits the agitation of the milk in the can to the very slight agitation which comes from the turning of the can with the reel. This type of reel construction is generally referred to as non-agitating, for the reason that it is relatively non-agitating, in that the can is not permitted to rotate on its own axis, as in the preheater shown in Fig. 3.

It will be understood, of course, that during the rest period of the sterilizer reel, the cans are absolutely at rest and the contents receive no agitation whatever, and then during the operating period of the sterilizer reel, the contents of the can receive the gentle agitation resulting from the can being carried around with the reel in its rotation.

When the cans leave the sterilizer through the transfer valve 27 (Fig. 7), they are introduced into the cooler D, where they immediately receive a jet of water from the nozzle 115, and from the nozzles 112, 113, which spray the water all over the interior surface of the upper portion of the shell. Also, the cans are deposited in the reciprocating spiral 60, which immediately starts to agitate the cans, whether the reel 51 is rotating or not, and this has been found extremely effective in preventing the formation of skin, which is so apt to form at the beginning of the cooling process.

The length of the agitating spiral 60 (Fig. 8) is designed to keep the can in constant agitation by reciprocating the can axially until the milk temperature has been lowered below the critical temperature at which skin forms, namely about 180° F. After the can has been transferred to the stationary reel portion 92, it is only agitated when the reel rotates. It will be understood that the reel of the cooler operates intermittently, because it operates in synchronism with the sterilizer reel. This agitation is sufficient in the latter part of the cooling process, because the milk is then at a safe low temperature.

While we have described a particular embodiment of the present invention, it will be obvious that various changes and modifications may be made in the details thereof without departing from the spirit of the present invention and the scope of the appended claims.

Having thus described our invention and in what manner the same may be used, what we claim as new and desire to protect by Letters Patent is:

1. In an apparatus for processing canned goods, a pair of treating chambers, a driven conveyor in each of said chambers for advancing a continuous procession of cans therethrough, means for transferring cans from the first of said chambers to the second, independent drive means for said conveyors, and control means for periodically interrupting operation of each of said drive means to stop the respective conveyors, said control means being operable to interrupt operation of the drive for the conveyor in the first chamber in advance of the interruption of the operation of the drive of the other conveyor whereby the cans in said transfer means are delivered to the second chamber before its conveyor is stopped.

2. In an apparatus for processing canned goods, a preheating chamber having a can inlet and a can outlet, a sterilizing chamber having a can inlet and a can outlet, means for heating said chambers, a driven conveyor in each of said chambers for advancing a continuous procession of cans therethrough, can transfer means arranged to receive cans from the preheating chamber outlet and deliver them to the inlet of the sterilizing chamber, drive means for said conveyors and means for controlling the operation of said drive means to periodically interrupt the operation of said conveyors, said control means being operable to interrupt the operation of said preheating chamber conveyor in advance of said sterilizing chamber conveyor whereby any cans in said transfer means when operation of said preheating chamber conveyor is interrupted are delivered to said sterilizing chamber before operation of the sterilizing chamber conveyor is interrupted.

3. In an apparatus for processing canned goods, a treating chamber having an intermittently operable can conveyor therewithin, a continuously operating can handling machine in advance of said treating chamber, means for transferring cans from said can handling machine to said treating chamber, said can handling machine delivering cans to said transfer means at a substantially constant rate, said transfer means having a capacity sufficient to receive and accumulate the cans discharged from said can handling machine during idle periods of said intermittently operable conveyor, and means for actuating said conveyor during each operating period at a greater can rate than said delivery rate of said can handling machine to enable said treating chamber to receive the cans accumulated in said transfer means during the preceding idle period of said conveyor.

4. In an apparatus for processing canned evaporated milk by the continuous method, a sterilizer having a fixed canway for directing the cans therethrough and a rotary reel for advancing the cans along said canway, means for intermittently driving said reel for uniform periods of time at regular intervals, a cooler comprising a canway having a movable and a stationary portion and a reel for advancing the cans along said canway, means for driving the cooler reel in synchronism with said sterilizer reel, means for discharging the cans from said sterilizer reel into said cooler reel, and means to constantly agitate the movable portion of said cooler canway.

5. In an apparatus for processing canned goods, a pair of treating chambers, a driven conveyor in each of said chambers for advancing a continuous procession of cans therethrough, a gravity chute connecting said first chamber for receiving cans discharged therefrom, a can elevator connecting said chute and second chamber, drive means for said conveyors, and control means for periodically interrupting the operation of each of said conveyors to stop progress of the cans through said chambers, said control means being operable to interrupt the conveyor in said first chamber in advance of the conveyor of the other chamber whereby the cans in said gravity chute are passed out of said chute before the second conveyor is stopped.

6. In an apparatus for processing canned goods, a first heat treating chamber, a second heat treating chamber, a canway in each chamber along which to advance a continuous procession of cans, means in each chamber for advancing the cans in their respective canways, means for actuating the can advancing means of said first chamber, independent means for actuating the can advancing means of said second chamber, a transfer chute between said two heat treating chambers, means for interrupting the operation of said can advancing means of said chambers to arrest advancement of cans therein, and timing means including a device for recurrently actuating said interrupting means at regular intervals, whereby the can advancing means of said first chamber are actuated in advance of the actuation of the can advancing means in said second chamber and the cans in said transfer chute when the can advancing means of said first chamber is stopped, are passed out therefrom before the can advancing means of said second chamber is stopped.

7. In an apparatus for processing canned goods, a continuously operating can handling machine, adapted to deliver cans at a substantially constant rate, a first treating chamber, a second treating chamber, a can conveyor in each of said chambers for advancing cans therethrough, means for periodically interrupting the operation of said conveyors whereby the cans in said chambers are intermittently stopped and advanced in their progress through said chambers, means for transferring cans from said can handling machine to said first treating chamber, said transfer means having a capacity sufficient to receive and accumulate cans discharged from said can handling machine during the idle periods of the intermittent operation of the conveyor of said first treating chamber, means for transferring cans from said first chamber to said second chamber, means for actuating the conveyor of said first chamber during the operating period of its intermittent operation at a greater can rate than the can delivery rate of said can handling machine, whereby said first chamber may receive the cans accumulated in said first mentioned transfer means during the idle periods of said first chamber conveyor, and means for interrupting the operation of the conveyor in said second chamber subsequent to that of said first chamber whereby cans in the transfer means between said chambers when the conveyor in said first chamber is stopped may be delivered to said second chamber before the conveyor of said second chamber is stopped.

8. In an apparatus for processing canned goods, a sterilizer having a conveyor for advancing the cans therethrough, a cooler having a conveyor for receiving the cans from said sterilizer conveyor and advancing them through said cooler, means for operably interconnecting said sterilizing conveyor and cooler conveyor, means for recurrently interrupting the operation of said conveyors at predetermined intervals whereby the cans in said sterilizer and cooler are intermittently advanced and stopped for predetermined periods of time, and means for constantly agitating the cans in said cooler conveyor adjacent the inlet end of said cooler in the period when advancement of the cans in the cooler is stopped.

9. In an apparatus for processing canned goods, a sterilizer, a driven conveyor therein for moving the cans through said sterilizer, means for operating said conveyor intermittently for uniform periods of time at regular intervals whereby to recurrently stop and advance the cans in their movement through said sterilizer, a cooler, a conveyor in said cooler for moving the cans through the cooler, said cooler conveyor having a can agitating portion in the forepart of the cooler and a non-agitating portion in the rear part of the cooler, means for operating the cooler conveyor simultaneously with the sterilizer conveyor, means for discharging the cans from said sterilizer conveyor into the cooler conveyor during the operation of both conveyors, and means for constantly actuating the can agitating portion of the cooler conveyor to constantly agitate the cans therein.

ALBERT R. THOMPSON.
          his
     JOSEPH  ×  BUCHER.
          mark

Witnesses:
 GEORGE N. GLENDENNING.
 PROSPER REITER, Jr.